United States Patent
Kumai

(10) Patent No.: US 12,409,840 B2
(45) Date of Patent: Sep. 9, 2025

(54) VEHICLE CONTROL APPARATUS

(71) Applicant: TOYOTA JIDOSHA KABUSHIKI KAISHA, Toyota (JP)

(72) Inventor: Yuichi Kumai, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/641,995

(22) Filed: Apr. 22, 2024

(65) Prior Publication Data
US 2024/0375660 A1     Nov. 14, 2024

(30) Foreign Application Priority Data

May 9, 2023 (JP) ................................ 2023-077242

(51) Int. Cl.
*B60W 30/18* (2012.01)
*B60W 50/10* (2012.01)

(52) U.S. Cl.
CPC ...... *B60W 30/18163* (2013.01); *B60W 50/10* (2013.01); *B60W 2554/802* (2020.02); *B60W 2720/24* (2013.01)

(58) Field of Classification Search
CPC .......... B60W 30/18163; B60W 50/10; B60W 2554/802; B60W 2720/24
See application file for complete search history.

(56) References Cited

U.S. PATENT DOCUMENTS

| | | | |
|---|---|---|---|
| 10,793,147 B2 | 10/2020 | Kaminade et al. | |
| 10,870,349 B2 | 12/2020 | Uejima | |
| 10,953,883 B2 | 3/2021 | Sakaguchi | |
| 10,981,569 B2 | 4/2021 | Hashimoto et al. | |
| 11,014,563 B2 | 5/2021 | Hashimoto et al. | |
| 11,072,334 B2 | 7/2021 | Aoki et al. | |
| 11,267,473 B2 | 3/2022 | Takahashi | |
| 11,279,360 B2 | 3/2022 | Fukuda et al. | |
| 2019/0107835 A1 | 4/2019 | Hashimoto | |
| 2019/0202471 A1 | 7/2019 | Hashimoto | |
| 2020/0070889 A1 | 3/2020 | Fukuda et al. | |

(Continued)

FOREIGN PATENT DOCUMENTS

| | | |
|---|---|---|
| JP | 2019-069711 A | 5/2019 |
| JP | 2019-119269 A | 7/2019 |

(Continued)

*Primary Examiner* — Xiao En Mo
(74) *Attorney, Agent, or Firm* — Oliff PLC

(57) ABSTRACT

A vehicle control apparatus executes a lane change control of providing a driver of an own vehicle with a proposal of changing lanes and automatically changes lanes when the driver approves of the proposal. When the driver performs an acceleration operation when the vehicle control apparatus provides the driver with a proposal of changing lanes to move the own vehicle to a next lane for overtaking a preceding vehicle, the vehicle control apparatus determines that the driver approves of the proposal. When the driver performs a deceleration operation when the vehicle control apparatus provides the driver with a proposal of changing lanes to return the own vehicle to an original lane after the own vehicle moves to the next lane and overtakes the preceding vehicle, the vehicle control apparatus determines that the driver approves of the proposal.

4 Claims, 4 Drawing Sheets

(56) References Cited

U.S. PATENT DOCUMENTS

| | | |
|---|---|---|
| 2020/0247400 A1 | 8/2020 | Fujii |
| 2021/0284164 A1* | 9/2021 | Hirosawa .......... B60W 60/0055 |
| 2022/0234586 A1 | 7/2022 | Oniwa et al. |
| 2024/0132068 A1* | 4/2024 | Hempel ............. B60W 30/146 |

FOREIGN PATENT DOCUMENTS

| | | |
|---|---|---|
| JP | 2022-113048 A | 8/2022 |
| JP | 2022-128973 A | 9/2022 |

* cited by examiner

VEHICLE CONTROL APPARATUS

CROSS-REFERENCE TO RELATED APPLICATIONS

This application claims priority to Japanese patent application No. JP 2023-077242 filed on May 9, 2023, the content of which is hereby incorporated by reference in its entirety.

BACKGROUND

Field

The present invention relates to a vehicle control apparatus.

Description of the Related Art

There is known a vehicle control apparatus which is configured to propose changing lanes to a driver of an own vehicle, determine that the driver approves of a proposal of changing lanes when the driver operates a predetermined button, and automatically change lanes on which the own vehicle is moving (for example, refer to JP 2022-113048 A).

In the vehicle control apparatus described above, the driver needs to operate the predetermined button for approving of the proposal of changing lanes. An operation applied to the predetermined button is not an operation necessary for the driver to travel the own vehicle such as an operation to accelerate or decelerate the own vehicle. Therefore, the driver may feel bothersome.

SUMMARY

An object of the present invention is to provide a vehicle control apparatus which enable the driver approve of a proposal of changing lanes for the own vehicle by a simple operation.

A vehicle control apparatus according to the present invention comprises an electronic control unit which executes a lane change control of providing a driver of an own vehicle with a proposal of changing lanes and automatically change lanes when the driver approves of the proposal. The electronic control unit is configured to, when the driver performs an acceleration operation when the electronic control unit provides the driver with a proposal of changing lanes to move the own vehicle to a next lane for overtaking a preceding vehicle, determine that the driver approves of the proposal of changing lanes to move the own vehicle to the next lane. Further, the electronic control unit is configured to, when the driver performs a deceleration operation when the electronic control unit provides the driver with a proposal of changing lanes to return the own vehicle to an original lane after the own vehicle moves to the next lane and overtakes the preceding vehicle, determine that the driver approves of the proposal of changing lanes to return the own vehicle to the original lane.

With the vehicle control apparatus according to the present invention, when the driver is provided with the proposal of changing lanes to move the own vehicle to the next lane, the driver can approve of the proposal by performing the acceleration operation. In general, when the driver makes a lane change to move the own vehicle to the next lane by their driving operation, the driver performs the acceleration operation. Therefore, the acceleration operation performed by the driver is a simple operation as an operation for approving of the proposal of changing lanes to move the own vehicle to the next lane. In addition, with the vehicle control apparatus according to the present invention, when the driver is provided with the proposal of changing lanes to return the own vehicle to the original lane, the driver can approve of the proposal by performing the deceleration operation. In general, when the driver makes a lane change to return the own vehicle to the original lane by their driving operation, the driver performs the deceleration operation. Therefore, the deceleration operation performed by the driver is a simple operation as an operation for approving of the proposal of changing lanes to return the own vehicle to the original lane. Thus, the driver can approve of the proposal of changing lanes by performing a simple operation.

In the vehicle control apparatus according to an aspect of the present invention, the electronic control unit may be further configured to, when the driver performs the deceleration operation when the electronic control unit provides the driver with the proposal of changing lanes to move the own vehicle to the next lane, determine that the driver rejects the proposal of changing lanes to move the own vehicle to the next lane. In this aspect, the electronic control unit may be further configured to, when the driver performs the acceleration operation when the electronic control unit provides the driver with the proposal of changing lanes to return the own vehicle to the original lane, determine that the driver rejects the proposal of changing lanes to return the own vehicle to the original lane.

As described above, In general, when the driver makes a lane change to move the own vehicle to the next lane by their driving operation, the driver performs the acceleration operation. Therefore, the deceleration operation performed by the driver is a simple operation as an operation for rejecting the proposal of changing lanes to move the own vehicle to the next lane. In addition, in general, when the driver makes a lane change to return the own vehicle to the original lane by their driving operation, the driver performs the deceleration operation. Therefore, the acceleration operation performed by the driver is a simple operation as an operation for rejecting the proposal of changing lanes to return the own vehicle to the original lane. Thus, with the vehicle control apparatus according to this aspect of the present invention, the driver can reject the proposal of changing lanes by performing a simple operation.

In the vehicle control apparatus according to another aspect of the present invention, the electronic control unit may be further configured to provide the driver with the proposal of changing lanes to move the own vehicle to the next lane when a distance between the own vehicle and the preceding vehicle becomes equal to or smaller than a predetermined distance, and a travelling speed of the own vehicle is greater than a travelling speed of the preceding vehicle.

The vehicle control apparatus according to this aspect of the present invention can determine whether to provide the proposal of changing lanes to move the own vehicle to the next lane based on the distance between the own vehicle and the preceding vehicle, and the travelling speeds of the own vehicle and the preceding vehicle.

In the vehicle control apparatus according to further another aspect of the present invention, the electronic control unit may be further configured to provide the driver with the proposal of changing lanes to return the own vehicle to the original lane when a space where the own vehicle can enter exists ahead of the preceding vehicle after the vehicle moves to the next lane and overtakes the preceding vehicle.

The vehicle control apparatus according to this aspect of the present invention can determine whether to provide the proposal of changing lanes to return the own vehicle to the original lane by determining whether a space where the own vehicle can enter exists ahead of the preceding vehicle.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

Figure 1:
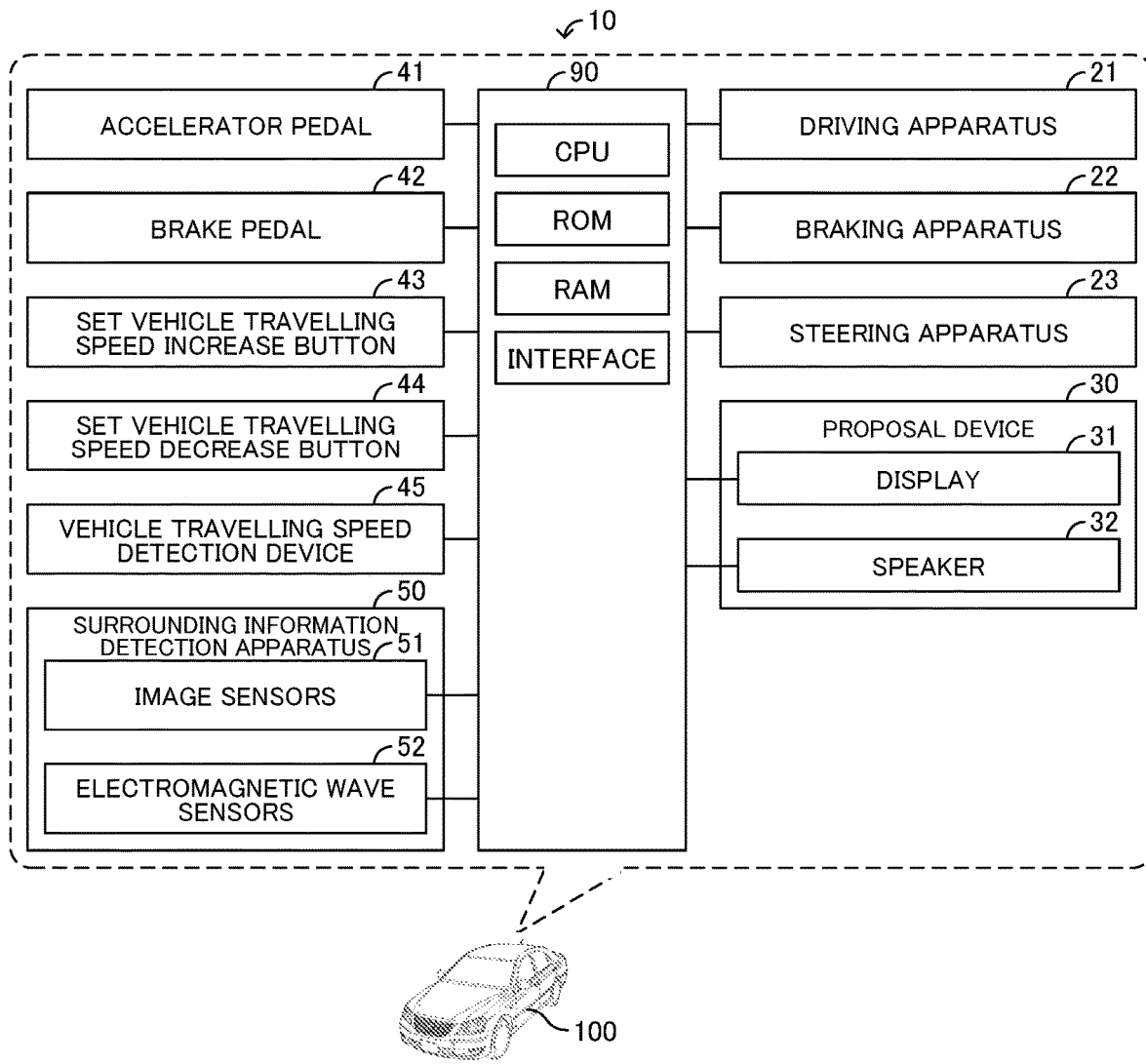
FIG. 1 is a view which shows a vehicle control apparatus according to an embodiment of the present invention.

Below, a vehicle control apparatus according to an embodiment of the present invention will be described with reference to the drawings. As shown in FIG. 1, the vehicle control apparatus 10 according to the present invention is mounted on an own vehicle 100. The vehicle control apparatus 10 may be mounted on a vehicle that can be driven remotely.

Further, the present invention can be applied not only to a manual driving vehicle which is driven by manual driving in which a driver performs a driving operation on the own vehicle 100 by himself/herself, but also to an automatic driving vehicle which is driven by automatic driving in which a control device such as an ECU automatically drives the own vehicle 100 without the driver performing the driving operation by himself/herself.

As shown in FIG. 1, the vehicle control apparatus 10 includes an ECU (an electronic control device) 90 as a control device. The ECU 90 includes a microcomputer as a main component. The microcomputer includes a storage medium such as a CPU, a ROM, a RAM and a non-volatile memory, an interface, and the like. The CPU is configured or programmed to realize various functions by executing instructions, programs, or routines stored in the storage medium. In particular, in the present embodiment, the vehicle control apparatus 10 stores, in the storage medium, programs for realizing various kinds of controls executed by the vehicle control apparatus 10.

It should be noted that the vehicle control apparatus 10 may be configured to be able to update the programs stored in the storage medium by wireless communication (for example, Internet communication) with external devices.

As shown in FIG. 1, the own vehicle 100 is equipped with a driving apparatus 21, a braking apparatus 22, and a steering apparatus 23. The driving apparatus 21, the braking apparatus 22, and the steering apparatus 23 are electrically connected to the ECU 90. The vehicle control apparatus 10 controls a driving force applied to the own vehicle 100 by controlling operations of the driving apparatus 21. Further, the vehicle control apparatus 10 controls a braking force applied to the own vehicle 100 by controlling operations of the braking apparatus 22. Further, the vehicle control apparatus 10 controls a steering force applied to the own vehicle 100 by controlling operations of the steering apparatus 23.

Further, the own vehicle 100 is equipped with a proposal device 30, an accelerator pedal 41 as an acceleration operation device, a brake pedal 42 as a deceleration operation device, a set vehicle travelling speed increase button 43 as a set vehicle travelling speed increase operation device, a set vehicle travelling speed decrease button 44 as a set vehicle travelling speed decrease operation device, a vehicle travelling speed detection device 45, and a surrounding information detection apparatus 50.

The proposal device 30 is a device which provides a proposal of changing lanes of the own vehicle 100, which will be described later, to a driver of the own vehicle 100. In the present embodiment, the proposal device 30 includes a display 31 and a speaker 32. The display 31 as a displaying device and the speaker 32 as an audio device are electrically connected to the ECU 90, respectively. The vehicle control apparatus 10 displays a lane change proposal image, which will be described later, on the display 31, and outputs lane change proposal sound, which will be described later, from the speaker 32.

The accelerator pedal 41 is a device operated by the driver of the own vehicle 100 to accelerate the own vehicle 100. The accelerator pedal 41 is electrically connected to the ECU 90. The vehicle control apparatus 10 acquires an operation amount of the accelerator pedal 41 and controls the driving force applied to the own vehicle 100 in accordance with the operation amount.

The brake pedal 42 is a device operated by the driver to decelerate the own vehicle 100. The brake pedal 42 is electrically connected to the ECU 90. The vehicle control apparatus 10 acquires an operation amount of the brake pedal 42 and controls the braking force applied to the own vehicle 100 in accordance with the operation amount.

The set vehicle travelling speed increase button 43 is a device operated by the driver to increase a set vehicle travelling speed Vset in a constant speed travel control. The constant speed travel control is a control of automatically maintaining an own vehicle travelling speed Vego at the set vehicle travelling speed Vset. The set vehicle travelling speed increase button 43 is electrically connected to the ECU 90. The vehicle control apparatus 10 increases the set vehicle travelling speed Vset when the set vehicle travelling speed increase button 43 is operated.

The set vehicle travelling speed decrease button 44 is a device operated by the driver to decrease the set vehicle travelling speed Vset in the constant speed travel control. The set vehicle travelling speed decrease button 44 is electrically connected to the ECU 90. The vehicle control apparatus 10 decreases the set vehicle travelling speed Vset when the set vehicle travelling speed decrease button 44 is operated.

The vehicle travelling speed detection device 45 is electrically connected to the ECU 90. The vehicle control apparatus 10 acquires a traveling speed of the own vehicle 100 as the own vehicle travelling speed Vego by the vehicle travelling speed detection device 45. The vehicle travelling speed detection device 45 includes, for example, wheel rotation speed sensors.

The surrounding information detection apparatus 50 is an apparatus which detects information on situations around the own vehicle 100. In the present embodiment, the surrounding information detection apparatus 50 includes image sensors 51 and electromagnetic wave sensors 52.

The image sensor 51 is a sensor which captures and acquires images of views around the own vehicle 100. The image sensor 51 is, for example, a camera. The image sensors 51 are electrically connected to the ECU 90, respectively. The vehicle control apparatus 10 acquires images (or surrounding images) around the own vehicle 100 as surrounding detection information IF by the image sensors 51.

The electromagnetic wave sensor 52 is a sensor which detects objects existing around the own vehicle 100. The electromagnetic wave sensor 52 is, for example, a radio wave sensor such as a radar sensor such as a millimeter wave radar, a sound wave sensor such as an ultrasonic sensor such as a clearance sonar, or an optical sensor such as a laser radar such as a LIDAR. The electromagnetic wave sensors 52 are electrically connected to the ECU 90, respectively. The vehicle control apparatus 10 acquires, by the electromagnetic wave sensors 52, information (or object information) related to the objects around the own vehicle 100 as the surrounding detection information IF.

<Operations of Vehicle Control Apparatus>

Next, operations of the vehicle control apparatus 10 will be described. The vehicle control apparatus 10 executes a lane change control of automatically changing lanes of the own vehicle 100 when a predetermined condition becomes satisfied by executing a routine shown in FIG. 2 at a predetermined calculation cycle.

Figure 2:
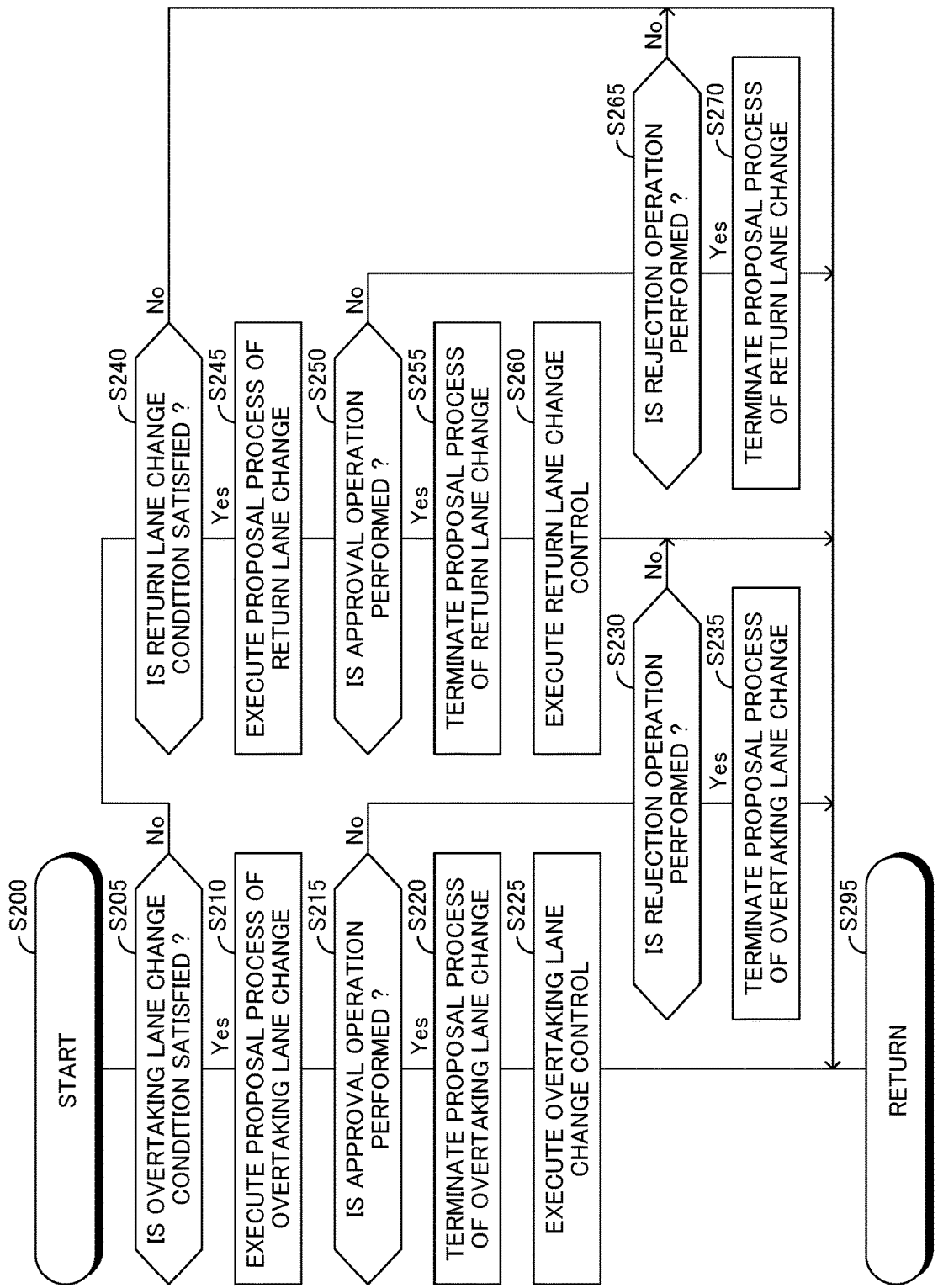
FIG. 2 is a view which shows a flowchart of a routine executed by the vehicle control apparatus according to the embodiment of the present invention.

At a predetermined timing, the vehicle control apparatus 10 starts a process from a step S200 of the routine shown in FIG. 2 and proceeds with the process to a step S205 to determine whether or not an overtaking lane change condition C1 is satisfied.

Figure 3:
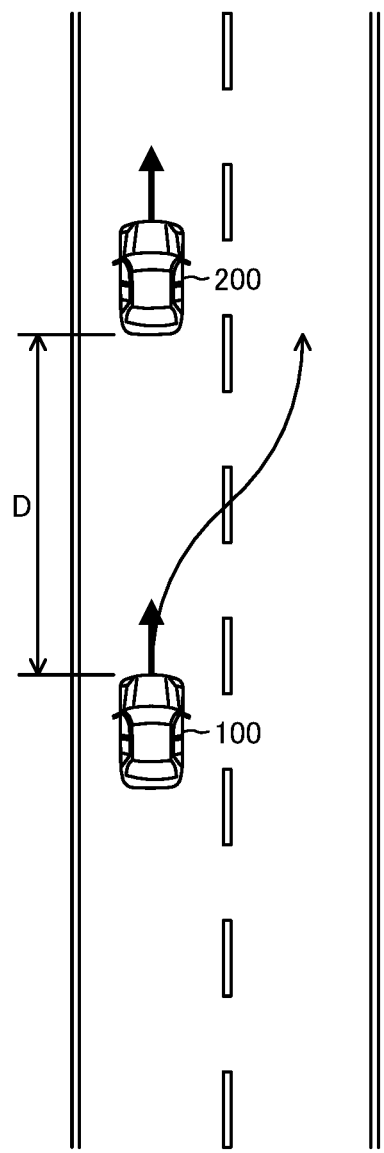
FIG. 3 is a view which shows a scene that an overtaking lane change proposal is provided.

As shown in FIG. 3, the overtaking lane change condition C1 is a condition that the driver is presumed to desire to perform an overtaking lane change control to be described later. More specifically, the overtaking lane change condition C1 is, for example, a condition that and inter-vehicle distance D, i.e., a distance between the own vehicle 100 and a preceding vehicle 200 is equal to or smaller than a predetermined distance (or a predetermined inter-vehicle distance Dth) and the own vehicle travelling speed Vego is greater than a traveling speed Vpre of the preceding vehicle 200 by a predetermined speed ΔV or more (Vego≥Vpre+ΔV). The vehicle control apparatus 10 acquires the inter-vehicle distance D and the traveling speed Vpre of the preceding vehicle 200 based on the surrounding detection information IF. The overtaking lane change condition C1 may include a condition that a lane keeping control is being executed. The lane keeping control is a control of assisting a steering of the own vehicle 100 such that the own vehicle 100 travels while maintaining a center position of a lane. Further, the predetermined speed ΔV is set to a value greater than zero.

When the vehicle control apparatus 10 determines "Yes" at the step S205, the vehicle control apparatus 10 proceeds with the process to a step S210 to execute a proposal process of an overtaking lane change. The proposal process of the overtaking lane change is a process of providing the driver with an overtaking lane change proposal, i.e., a proposal of changing lanes to move the own vehicle 100 to a next lane to overtake the preceding vehicle 200. In the present embodiment, the proposal process of the overtaking lane change is a process of displaying the overtaking lane change proposal on the display 31 and/or outputting the overtaking lane change proposal from the speaker 32.

Next, the vehicle control apparatus 10 proceeds with the process to a step S215 to determine whether or not the driver performs an approval operation. In the present embodiment, the approval operation at the step S215 is an accelerator operation or an acceleration operation, i.e., an operation applied to the accelerator pedal 41 by the driver or a set vehicle travelling speed increase operation or an acceleration operation, i.e., an operation applied to the set vehicle travelling speed increase button 43.

When the vehicle control apparatus 10 determines "Yes" at the step S215, the vehicle control apparatus 10 proceeds with the process to a step S220 to terminate executing the proposal process of the overtaking lane change, and then proceeds with the process to a step S225 to execute the overtaking lane change control. The overtaking lane change control is a lane change control of controlling the steering force applied to the own vehicle 100 to change lanes to move the own vehicle 100 to the next lane. Next, the vehicle control apparatus 10 proceeds with the process to a step S295 to terminate executing this routine once.

That is, when the acceleration operation is performed by the driver when the vehicle control apparatus 10 provides the driver with a proposal of changing lanes to move the own vehicle to the next lane to overtake the preceding vehicle 200, the vehicle control apparatus 10 determines that the driver approves of the proposal of changing lanes to move the own vehicle 100 to the next lane and executes the overtaking lane change control.

On the other hand, when the vehicle control apparatus 10 determines "No" at the step S215, the vehicle control apparatus 10 proceeds with the process to a step S230 to determine whether or not a rejection operation is performed by the driver. In the present embodiment, the rejection operation at the step S230 is a brake operation or a deceleration operation, i.e., an operation applied to the brake pedal 42 or a set vehicle travelling speed decrease operation or a deceleration operation, i.e., an operation applied to the set vehicle travelling speed decrease button 44 by the driver.

When the vehicle control apparatus 10 determines "Yes" at the step S230, the vehicle control apparatus 10 proceeds with the process to a step S235 to terminate executing the proposal process of the overtaking lane change, and then proceeds with the process to the step S295 to terminate executing this routine once.

That is, when the driver performs the deceleration operation when the vehicle control apparatus 10 provides the driver with the proposal of changing lanes to move the own vehicle 100 to the next lane, the vehicle control apparatus 10 determines that the driver rejects the proposal of changing lanes to move the own vehicle 100 to the next lane and does not execute the overtaking lane change control.

On the other hand, when the vehicle control apparatus 10 determines "No" at the step S230, the vehicle control apparatus 10 proceeds with the process to the step S295 to terminate executing the process of this routine once.

It should be noted that the vehicle control apparatus 10 may be configured to determine that the driver rejects the overtaking lane change proposal and terminate executing the proposal process of the overtaking lane change when an overtaking proposal time T1, i.e., a time elapsed from starting executing the proposal process of the overtaking lane change at the step S210 becomes equal to or greater than a predetermined time (or a predetermined overtaking proposal time T1_th). Of course, in this case, the overtaking lane change control is not performed.

In addition, when the vehicle control apparatus 10 determines "No" at the step S205, the vehicle control apparatus 10 proceeds with the process to a step S240 to determine whether or not a return lane change condition C2 is satisfied.

Figure 4:
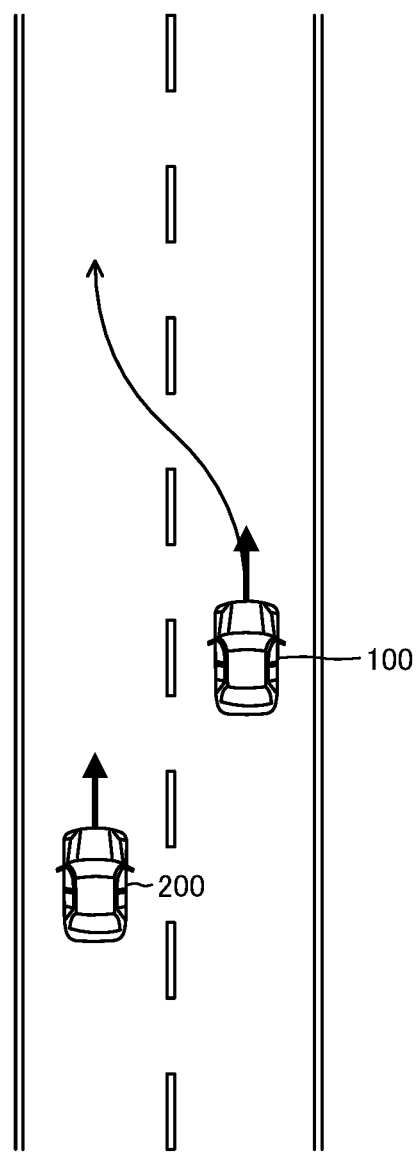
FIG. 4 is a view which shows a scene that a returning lane change proposal is provided.

As shown in FIG. 4, the return lane change condition C2 is a condition that the driver is presumed to desire to perform a return lane change control described later. More specifically, the return lane change condition C2 is, for example, a condition that a space where the own vehicle 100 can enter exists ahead of the preceding vehicle 200 after the own vehicle 100 overtakes the preceding vehicle 200. The vehicle control apparatus 10 determines whether or not a space where the own vehicle 100 can enter exists ahead of the preceding vehicle 200 enters based on the surrounding detection information IF. Further, when the overtaking lane change condition C1 includes a condition that the lane keeping control is being executed, the return lane change condition C2 also includes a condition that the lane keeping control is being executed.

When the vehicle control apparatus 10 determines "Yes" at the step S240, the vehicle control apparatus 10 proceeds with the process to a step S245 to execute a proposal process of a return lane change. The proposal process of the return lane change is a return lane change proposal, i.e., a process of providing the driver with a proposal of enter the own vehicle 100 into the space ahead of the preceding vehicle 200. In the present embodiment, the proposal process of the return lane change is a process of displaying the return lane change proposal on the display 31 and/or outputting the return lane change proposal from the speaker 32.

Next, the vehicle control apparatus 10 proceeds with the process to a step S250 to determine whether or not the driver performs an approval operation. In the present embodiment, the approval operation at the step S250 is the braking operation (i.e., the deceleration operation) or the set vehicle travelling speed decrease operation (i.e., the deceleration operation).

When the vehicle control apparatus 10 determines "Yes" at the step S250, the vehicle control apparatus 10 proceeds with the process to a step S255 to terminate executing the proposal process of the return lane change, and then proceeds with the process to a step S260 to execute the return lane change control. The return lane change control is a lane change control of controlling the steering force applied to the own vehicle 100 to change lanes to return the own vehicle 100 to an original lane by entering the own vehicle 100 into the space ahead of the preceding vehicle 200. Next, the vehicle control apparatus 10 proceeds with the process to the step S295 to terminate executing this routine once.

That is, when the deceleration operation is performed by the driver when the vehicle control apparatus 10 provides the driver with a proposal of changing lanes to return the own vehicle 100 to the original lane after the own vehicle 100 moves to the next lane and overtakes the preceding vehicle 200, the vehicle control apparatus 10 determines that the driver approve of the proposal of changing lanes to return the own vehicle 100 to the original lane and execute the return lane change control.

On the other hand, when the vehicle control apparatus 10 determines "No" at the step S250, the vehicle control apparatus 10 proceeds with the process to a step S265 to determine whether or not a rejection operation is performed by the driver. In the present embodiment, the rejection operation at the step S265 is the accelerator operation (i.e., the acceleration operation) or the set vehicle travelling speed increase operation (i.e., the acceleration operation) by the driver.

When the vehicle control apparatus 10 determines "Yes" at the step S265, the vehicle control apparatus 10 proceeds with the process to a step S270 to terminate the proposal process of the return lane change, and then proceeds with the process to the step S295 to terminate executing this routine once.

That is, when the acceleration operation is performed by the driver when the vehicle control apparatus 10 provides the driver with the proposal of changing lanes to return the own vehicle 100 to the original lane, the vehicle control device determines that the driver rejects the proposal of changing lanes to return the own vehicle 100 to the original lane and does not execute the return lane change control.

On the other hand, when the vehicle control apparatus 10 determines "No" at the step S270, the vehicle control apparatus 10 proceeds with the process to the step S295 to terminate executing this routine once.

The vehicle control apparatus 10 may be configured to determine that the driver rejects the return lane change proposal and terminate executing the proposal process of the return lane change when a return proposal time T2, i.e., a time elapsed from starting executing the proposal process of the return lane change at the step S245 becomes equal to or greater than a predetermined time (i.e., a predetermined return proposal time T2_th). Of course, in this case, the return lane change control is not executed. Further, the predetermined return proposal time T2_th may be set to a time equal to or different from the predetermined overtaking proposal time T1_th.

It should be noted that the present invention is not limited to the above-described embodiments, and various modifications can be adopted within the scope of the present invention.

What is claimed is:

1. A vehicle control apparatus comprising an electronic control unit which executes a lane change control of providing a driver of an own vehicle with a proposal of changing lanes and automatically change lanes when the driver approves of the proposal,
    wherein the electronic control unit is configured to:
        when the driver performs an acceleration operation when the electronic control unit provides the driver with a proposal of changing lanes to move the own vehicle to a next lane for overtaking a preceding vehicle, determine that the driver approves of the proposal of changing lanes to move the own vehicle to the next lane;
        when the driver performs a deceleration operation when the electronic control unit provides the driver with a proposal of changing lanes to return the own vehicle to an original lane after the own vehicle moves to the next lane and overtakes the preceding vehicle, determine that the driver approves of the proposal of changing lanes to return the own vehicle to the original lane.

2. The vehicle control apparatus according to claim 1, wherein the electronic control unit is configured to:
    when the driver performs the deceleration operation when the electronic control unit provides the driver with the proposal of changing lanes to move the own vehicle to the next lane, determine that the driver rejects the proposal of changing lanes to move the own vehicle to the next lane;
    when the driver performs the acceleration operation when the electronic control unit provides the driver with the proposal of changing lanes to return the own vehicle to the original lane, determine that the driver rejects the proposal of changing lanes to return the own vehicle to the original lane.

3. The vehicle control apparatus according to claim 1, wherein the electronic control unit is configured to provide the driver with the proposal of changing lanes to move the own vehicle to the next lane when a distance between the own vehicle and the preceding vehicle becomes equal to or smaller than a predetermined distance, and a travelling speed of the own vehicle is greater than a travelling speed of the preceding vehicle.

4. The vehicle control apparatus according to claim 1, wherein the electronic control unit is configured to provide the driver with the proposal of changing lanes to return the own vehicle to the original lane when a space where the own vehicle can enter exists ahead of the preceding vehicle after the vehicle moves to the next lane and overtakes the preceding vehicle.

* * * * *